No. 684,612. Patented Oct. 15, 1901.
C. J. A. MICHALKE.
SYSTEM OF ELECTRICAL DISTRIBUTION.
(Application filed Dec. 31, 1897.)
(No Model.)
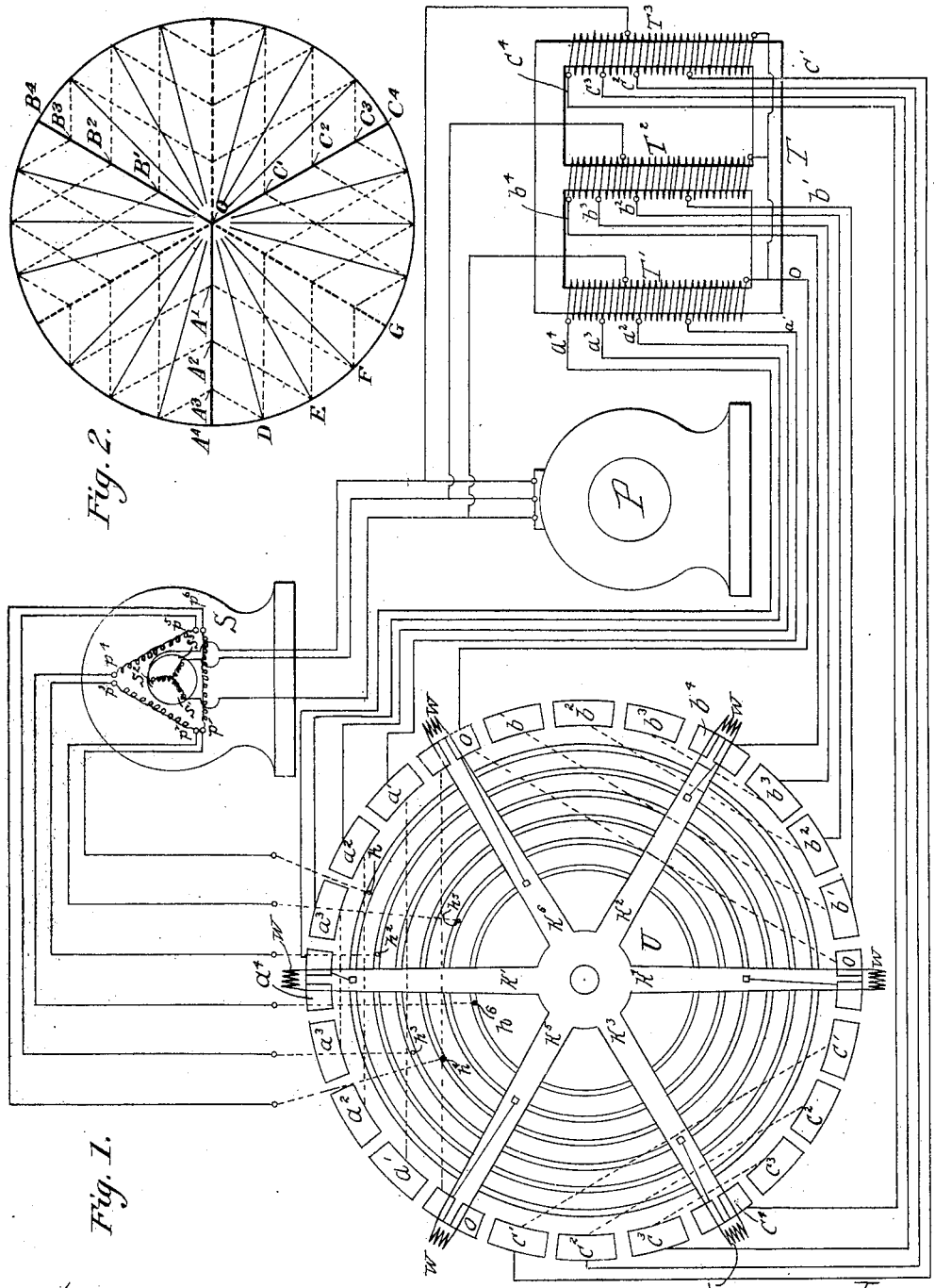
Inventor:
Carl Joseph August Michalke,
By Barton & Brown Attorneys.
Witnesses:
Max Zabel.
C. J. Schmidt.

UNITED STATES PATENT OFFICE.

CARL JOSEPH AUGUST MICHALKE, OF CHARLOTTENBURG, GERMANY, ASSIGNOR TO SIEMENS & HALSKE ELECTRIC COMPANY OF AMERICA, OF CHICAGO, ILLINOIS, A CORPORATION OF ILLINOIS.

SYSTEM OF ELECTRICAL DISTRIBUTION.

SPECIFICATION forming part of Letters Patent No. 684,612, dated October 15, 1901.

Application filed December 31, 1897. Serial No. 665,185. (No model.)

*To all whom it may concern:*

Be it known that I, CARL JOSEPH AUGUST MICHALKE, a subject of the Emperor of Germany, residing at Charlottenburg, Germany, have invented new and useful Improvements in Systems of Electrical Distribution, (Case No. 134,) of which the following is a specification, reference being had to the accompanying drawings, forming a part of this specification.

My invention relates to electrical systems of distribution, and has for its object to provide an improved means for transmitting synchronous motion from one point to another situated at a greater or less distance therefrom in such a manner that a determined movement at one point may be accurately reproduced at a distant point.

In my application, Serial No. 665,184, filed December 31, 1897, I have shown a system for transmitting a synchronous motion over long distances in which dynamo-electric machines are used for both the transmitting and the receiving devices, any movement of the transmitting device causing a corresponding movement of the movable element of the receiving device.

In my present application I provide a system for the transmission of motion in which one of the sets of windings of a dynamo-electric machine, constituting the receiving device, is supplied with current from a subdivided source of multiphase current through a switching device which operates to so vary the connections between the subdivided source and the winding on the receiving device that the field produced thereby will be shifted in phase by a predetermined amount whenever the contacts of the switching device are shifted by a determined amount.

The invention is illustrated in the accompanying drawings, in which—

Figure 1 is a view of a system embodying my invention, the circuit arrangements being shown in diagram; and Fig. 2 is a diagram illustrating the manner in which the electromotive forces of the subdivided source are compounded in order to produce the required phase shifting of the field in one of the members of the receiving device.

In the drawings, P indicates a source of multiphase current which is connected to the winding on the movable element of a dynamo-electric machine S, constituting the receiving device, the connection being made through the sliding contacts $s'$ $s^2$ $s^3$. This same source also supplies current to the transforming device T. In order to facilitate the explanation, the transformer is illustrated as having but a single winding, to which both the primary and secondary leads are connected. The transformer therefore transforms the tension in proportion to the sections of the windings included, respectively, in the primary and secondary circuits. Separate primary and secondary windings may, however, be employed, if desired. The windings $T'$ $T^2$ $T^3$ of the transforming device are each divided into a number of sections, the ends of the sections of the winding $T'$ being connected to the terminals $a'$ $a^2$ $a^3$ $a^4$, the ends of the sections of the winding $T^2$ to the terminals $b'$ $b^2$ $b^3$ $b^4$, and the ends of the sections of the winding $T^3$ to the terminals $c'$ $c^2$ $c^3$ $c^4$. A switching device U is provided for controlling the admission of the transformed currents to the winding on the stationary element of the receiving device. In the particular embodiment illustrated in the drawings this switching device is provided with an outer contact-ring divided into twenty-four segments of equal size, the segments being connected, respectively, with the terminals of the transformer T. The terminals are marked with letters corresponding to the terminals of the transformer to which the same are connected. In addition to the divided ring there are six contact-rings $h'$ $h^2$ $h^3$ $h^4$ $h^5$ $h^6$, which are connected by conductors to the terminals $p'$ to $p^6$ of the winding on the stationary part of the machine S. Arranged to move over the rings and segments is a series of six contact-arms $K'$ to $K^6$, of which the two opposite arms in each case belong to the same circuit. Each arm is provided with separated contacts, between which is interposed a resistance W, whereby the short-circuiting of the circuits is prevented during the operation of the switch. The zero-point $o$ of the transforming device is connected to the segments *o o o* of the switching device. The segments of the outer ring of the switching device are arranged at fifteen degrees apart, and the circuit connections are such that any shifting of the contacts from one position to that next adjoining will operate to shift the position of the resultant field generated in the fixed member of the receiving device by a similar amount and will thereby cause the movable part of the receiving device to shift through the same or a similar angle. If the subdivisions of the several windings of the transforming device are suitably determined arithmetically or graphically, a shifting of the phase may be obtained at each step without changing the amplitude of the currents. In Fig. 1 of the drawings the contact-arms of the switching device are in such a position that the contacts on the first pair of arms $K'$ $K^4$ connect one of the circuits on the fixed member of the receiving device to the transformer-terminals $a^4$ and $o$, the contacts on the second pair of arms connect the second circuit on the fixed member of the receiving device with the transformer-terminals $b^4$ and $o$, and the contacts on the third pair of arms connect the third circuit on the fixed member of the receiving device to the transformer-terminals $c^4$ and $o$. The fixed member is thus supplied through the transforming device with multiphase current of the same character and frequency as that supplied from the source directly to the winding of the rotating member. If the connections to the windings on the two members are similar, the action of the currents flowing therein will be such as to produce fields rotating in the same direction and at the same speed in both members, and the two members will assume such a relative position that these rotating fields will be coincident. If now the movable member of the switching device is turned contra-clockwise fifteen degrees from the position illustrated until the contacts of the first pair of arms pass onto the contacts $a^3 b'$, the contacts of the second pair of arms onto the contacts $b^3 c'$, and the contacts of the third pair of arms onto the contacts $c^3 a'$, the phases of the potentials impressed upon the terminals of the winding on the fixed member of the receiving device will be shifted by a corresponding amount, and as a result the field of the stationary member of the receiving device will be shifted by fifteen degrees, (if the winding is bipolar,) thus causing the movable part to move through the same angle.

The operation will be rendered clear by an inspection of the diagram in Fig. 2, which indicates the phase relation and magnitude of the electromotive forces generated at the secondary terminals of the transformer T. In this diagram the lines $O A^4$, $O B^4$, and $O C^4$ represent in magnitude and phase relation the electromotive forces generated in the three sections $T'$, $T^2$, and $T^3$ of the transformer-winding, while the subdivisions of these lines indicate the potentials generated in the various sections in the winding of each phase. Thus the line $O A'$ indicates, both in phase and magnitude, the potential between the zero-point $o$ and the secondary terminal to which the lead $a'$ is connected, the line $O A^2$ the potential between the zero-point and the secondary terminal to which the lead $a^2$ is connected, and so on. When the switching device is in the position shown in the drawings, the transformer-terminals $o a^4$, $o b^4$, and $o c^4$ are connected each in a separate circuit to the winding on the fixed member of the receiving device, the potentials impressed upon the several circuits of this winding having the phase relation indicated by the lines $O A^4 O B^4 O C^4$. The currents produced thereby operate to generate a rotating field or line of polarization in a manner well understood in the art, the position of the rotating field at any one instant being dependent upon the phases of the potentials impressed upon the said windings. When, however, the switching device is rotated contra-clockwise over the space of one segment, the connections are so changed that the circuit which before was connected across the terminals $o a^4$ of the transformer is now connected across the terminals $a^3 b'$ and the circuit which before was connected across the terminals $b^4 o$ is now connected across the terminals $b^3 c'$, the remaining circuit, which before was connected across the transformer-terminals $c^4 o$, now being connected across the terminals $c^3 b'$. This means that the winding which was formerly supplied with the potential $O A^4$ is now supplied with a potential $O A^3$ in series with a potential $O B'$ and that the winding which was formerly supplied with a potential $O B^4$ is now supplied with a potential $O B^3$ in series with a potential $O C'$ and that the winding which before was supplied with a potential $O C^4$ is now supplied with a potential $O C^3$ in series with a potential $O A'$. Referring now to the diagram, Fig. 2, it will be seen that the resultant of the potentials $O A^3$ and $O B'$ is represented by the line $O D$, which is shifted by fifteen degrees behind the line $O A^4$. Similarly, the potential across each of the other two windings is represented by a line which is shifted by fifteen degrees behind the line $O B^4$ and $O C^4$. A movement of the switching device by another fifteen degrees connects the first circuit of the receiving device across the terminals $a^2 b^2$ of the transformer, thereby again shifting the phase of the potential of the transformer into the position represented by the line $O E$ in Fig. 2, this line representing the resultant of the potentials $O A^2$ and $O B^2$. A movement by another fifteen degrees connects the first circuit to the terminals $a' b^3$ of the transformer and again shifts the potential at the terminals of this winding, as represented by the line $O F$ in Fig. 2. A movement by another fifteen degrees connects the terminals of the first circuit to the terminals $o b^4$ of the transformer, thus shifting the potential by another fifteen degrees, as represented by the line O G in Fig. 2, and so on for each of the successive positions of the switching device.

The shifting of the phase of the several potentials of the multiphase system operates to produce a similar shifting of the field generated in the stationary member of the receiving device, and this shifting of the phase of the field in one member causes a relative movement between the two members until the two fields are again brought into coincidence.

The employment of my system permits long-distance transmission of arbitrary movements through any distance desired and with any power that is desired. If the contact-arms of the switching device be turned mechanically at any number of revolutions, the movable element of the receiving device follows with the same number of revolutions in the same direction. With this arrangement slight power is required at the switch to impart any desired movement to the distant motor, since only the friction of the contact-brushes of the switch has to be overcome. Instead of the single apparatus or motor a number of motors may be employed connected in parallel or in series, and the same movements may be imparted to all of the motors by means of the one switch. It is desirable that the tensions generated at $p'\ p^2\ p^3\ p^4\ p^5\ p^6$ from the primary machine P through induction from the movable part of the motor S should equalize, as nearly as possible, the tensions generated by the transformer at the same terminals.

While I have herein shown and particularly described one embodiment of my invention, I do not wish to limit myself to the precise construction and arrangement herein shown, as modifications thereof may readily be made by those skilled in the art without departing from the spirit of my invention.

Having thus described my invention, what I claim as new, and desire to secure by Letters Patent of the United States, is—

1. In a system of alternating-current distribution, the combination with a source of alternating current, of a dynamo-electric machine provided with two sets of windings, one of the said windings receiving its current from the said source, a transformer provided with fixed coils interposed between the second aforesaid set of windings and the source of current, and means whereby the relative connections between the said transformer and the said second set of windings are varied, substantially as described.

2. In an alternating-current system of distribution, the combination with a dynamo-electric machine provided with two sets of windings one set being directly energized by the said source of current, a transformer also receiving its current from the said source, the second aforesaid set of windings receiving their current through the agency of the said transformer, and a switching means for connecting the said second set of windings alternatively with points of different potential upon the coils of the said transformer, substantially as described.

3. In an alternating-current system of distribution, the combination with a source of alternating current, of a dynamo-electric machine provided with two sets of windings, one of the said sets of windings receiving its current directly from the said source of current, a transformer interposed between the second aforesaid sets of windings and the said source of current, and means for changing the phase of the pressure impressed upon the second set of windings through the agency of the said transformer, substantially as described.

4. In an alternating-current system of distribution, the combination with a source of alternating current, of a dynamo-electric machine provided with two sets of windings, one of the said windings receiving current directly from the said source, a transformer provided with energizing-coils also receiving their current from the said source, and a switching means interposed between the coils of the said transformer and the second set of windings of the motor, whereby the phase of the pressure impressed upon the said second set of windings is varied for the purpose of creating in the said motor a movement corresponding to the movement of the switching means, substantially as described.

5. In an alternating-current system of distribution, the combination with a source of alternating current, of a dynamo-electric machine provided with two sets of windings, one of the said windings receiving current directly from the said source, a transformer provided with coils also receiving their current from the said source, a switching means having contact-points respectively connected with points of different potential upon the coils of the said transformer, interposed between the coils of the said transformer and the second set of windings of the motor, and a movable-switch portion for changing the phase of the pressure impressed upon the said second set of windings for the purpose of creating in the said motor a motion corresponding to the movable switch-arm, substantially as described.

6. A means for transmitting a determined movement to a distant point, comprising, in combination, a receiving device having relatively movable members, both of which are provided with multiphase windings, a source of multiphase current connected to the windings on one of said members, a subdivided source of multiphase current of the same frequency similarly connected to the winding on the other member, and a switching device for varying the connections between said winding and the said subdivided source.

7. A means for transmitting a determined movement to a distant point, comprising, in combination, a receiving device having relatively movable members both of which are provided with multiphase windings, connections from one of said windings to said source, a multiphase transforming device, having a plurality of secondary terminals for each phase, connected to the same source, and a switching device for connecting said terminals in different combinations to the winding on the other member of said machine.

8. A means for transmitting a determined movement to a distant point, comprising, in combination, a receiving device having relatively movable members, both of which are provided with multiphase windings, a source of multiphase current connected to the winding on one of said members, a subdivided source of multiphase current of the same frequency similarly connected to the winding on the other member, and a transmitting device constructed and arranged to vary the connections between the latter winding and the subdivided source in such a manner as to shift the phases of the current supplied to the said winding.

9. A means for transmitting a determined movement to a distant point, comprising, in combination, a receiving device having relatively movable members, both of which are provided with multiphase windings, a source of multiphase current connected to the winding on one of said members, a subdivided source of multiphase current of the same frequency similarly connected to the winding on the other member, and a transmitting device constructed and arranged to vary the connections between the latter winding and the subdivided source in such a manner as to simultaneously and similarly shift the phases of the current supplied to the said winding.

10. In combination, a dynamo-electric machine, a means for producing similarly-rotating fields in the relatively movable members of said machine, and a switching device in coöperative relation to one of said means, said switching device being constructed and arranged to shift, by a predetermined amount, the phase of the rotating field in one member with respect to that in the other member.

11. In combination, a dynamo-electric machine having relatively movable members, means for producing a rotating field in one of said members, a subdivided source of multiphase current connected to a winding on the other member and producing in said member a field rotating at the same rate as that in the other member, and means for changing the connections between said winding and said subdivided source in such a manner as to produce a predetermined phase displacement of the said fields.

12. In combination, a dynamo-electric machine having relatively movable members, both of which are provided with multiphase windings, a source of multiphase current connected to the winding on one of said members, a subdivided source of multiphase current similarly connected to the winding on the other member, and a switching device constructed and arranged to vary the connections between the subdivided source and the winding to which it is connected, in such a manner as to produce a predetermined phase displacement between the magnetic fields generated in said members.

13. In combination, a dynamo-electric machine having relatively movable members, both of which are provided with multiphase windings, a source of multiphase current connected to the winding on one of said members, a subdivided source of multiphase current having a series of terminals for each phase, and a switching device constructed and arranged to vary the connections between said terminals and the winding on the other member of the dynamo-electric machine in such a manner as to produce a predetermined phase displacement of the magnetic fields generated in the relatively movable members of the dynamo-electric machine upon a predetermined movement of the said switching device.

14. A dynamo-electric machine, both members of which are provided with multiphase windings, a source of multiphase current connected to the winding on one of said members, a multiphase transforming device, having a plurality of secondary terminals for each phase, connected to the same source, and a switch for connecting said terminals in different combinations to the winding on the other member of said machine.

15. A dynamo-electric machine, both members of which are provided with multiphase windings, a source of multiphase current connected to the winding on one of said members, a multiphase transforming device, having a plurality of secondary terminals for each phase, connected to the same source, and a switch, the contacts of which, in certain of its positions, connect the windings for each separate phase of the transformer across the terminals of a corresponding winding on the other member of said machine and, in other of its positions, connect portions of the windings for different phases in series with one another across the same terminals.

16. In combination, a dynamo-electric machine, both members of which are provided with multiphase windings, a source of multiphase current, leads connecting the winding on one of the members of said machine to said source, a multiphase transforming device, having a series of terminals for each phase, connected to said source, a switching device for successively connecting the said terminals in different combinations to the winding on the other member of the said machine, in such a manner as to produce a successive shifting in the phases of the current supplied to the winding on said member.

In testimony whereof I affix my signature in the presence of two witnesses.

CARL JOSEPH AUGUST MICHALKE.

Witnesses:
JOHANNES GÖRGES,
PAUL ROEDIGER.